9400X
I. Smith,
Corn-Sheller.
Patented Feb. 13. 1836.
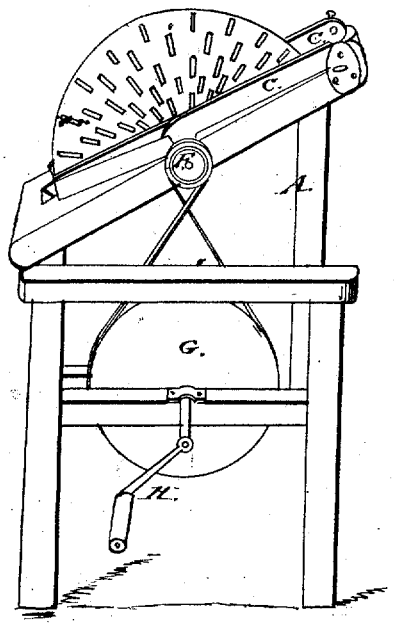
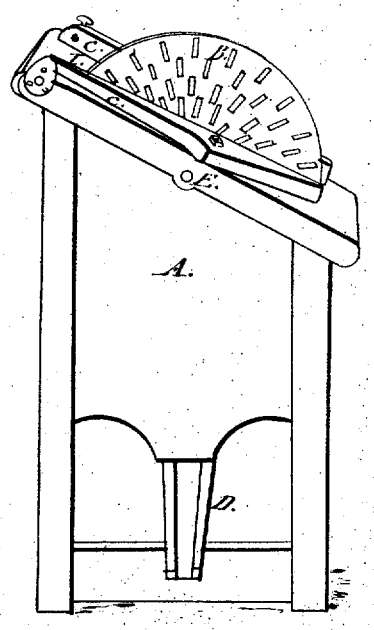

9400X Feb 13. 1836

Ira Smith's Corn Shelling
Letters Patent

The Schedule referred to in these Letters Patent and making part of the same containing a description in the words of the said Ira Smith himself of his improvement In the machine for Shelling corn Be it known that I Ira Smith of Downingtown in the County of Chester and State of Pennsylvania have made an improvement in the Machine for shelling corn, which is described as follows. This Machine is in most respects like those in common use except that the wheel for shelling has teeth or projections on both sides as will hereafter be described. The frame (A) contains (and supports the several parts of the Machinery. A wheel (B) having teeth or projections cast on both sides for shelling out the corn, Springs one on each side (C) for pressing the ears of corn against the corn shelling wheel (B). A spout (D) down which the shelled corn passes. The wheel (B) is hung on an axle (E) and has a pulley (F) on one end round which (and the pully (G) a band passes for turning it by means of the crank (H). The corn to be shelled is placed on an inclined plane (I) at the top of the Machine, it then passes down by its own gravity to the shelling wheel where it is drawn in by the teeth and shelled, the cobs flying out (and the grain descending into the spout. What I claim as my invention or discovery (and desire to be secured by Letters Patent, is putting teeth or projections on both sides of the wheel instead of one side as in the common method thereby shelling twice as fast. For a farther illustration of my invention I refer to the model (and drawing of the same deposited in the Patent Office Witnesses
Rudolph Stager
Samuel Snowden Ira Smith 36 words Patented 13th Feby 1836